Feb. 23, 1960 B. KARLOVITZ ET AL 2,925,620
GLASS FIBER PRODUCTION
Filed March 24, 1955 5 Sheets-Sheet 1

INVENTORS
BELA KARLOVITZ
BERNARD LEWIS
GUENTHER VON ELBE
BY
Brown, Critchlow, Flick & Peckham
THEIR ATTORNEYS Feb. 23, 1960   B. KARLOVITZ ET AL   2,925,620
GLASS FIBER PRODUCTION
Filed March 24, 1955   5 Sheets-Sheet 2
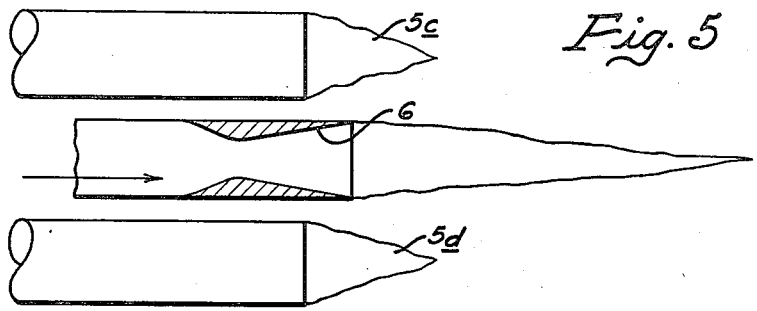
Fig. 5
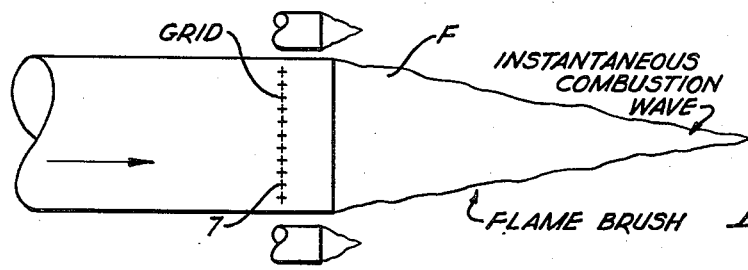
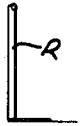
Fig. 6
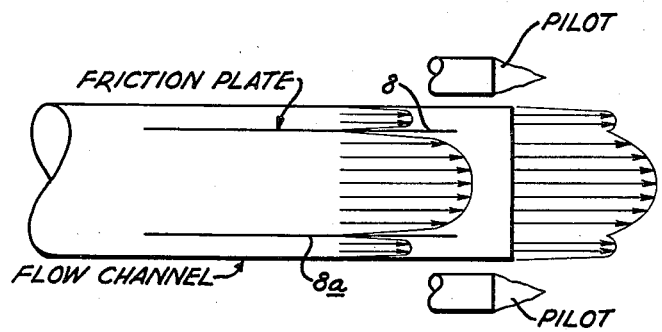
Fig. 7
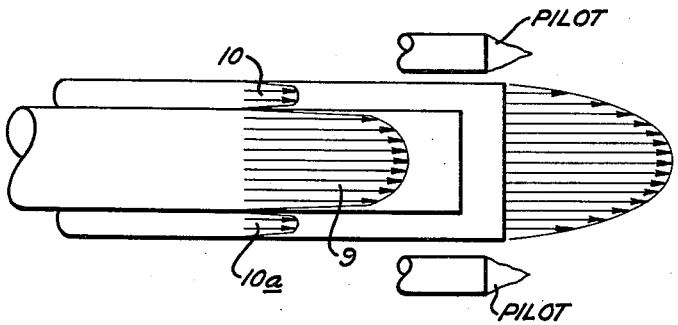
Fig. 8
INVENTORS
BELA KARLOVITZ
BERNARD LEWIS
GUENTHER VON ELBE
BY Brown, Critchlow, Flick & Peckham
THEIR ATTORNEYS

INVENTORS
BELA KARLOVITZ
BERNARD LEWIS
GUENTHER VON ELBE

Feb. 23, 1960  B. KARLOVITZ ET AL  2,925,620
GLASS FIBER PRODUCTION
Filed March 24, 1955  5 Sheets-Sheet 4
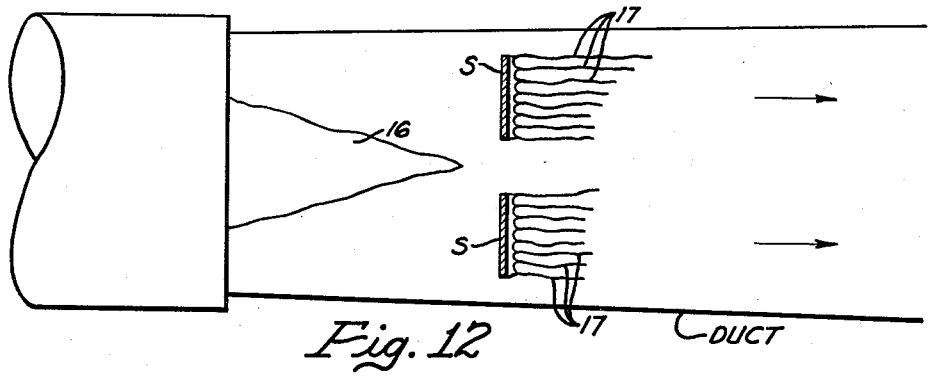
Fig. 12
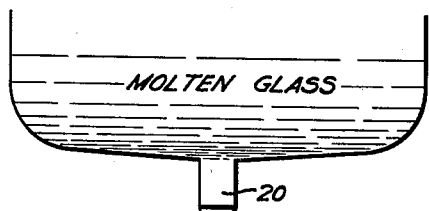
Fig. 15
Fig. 13
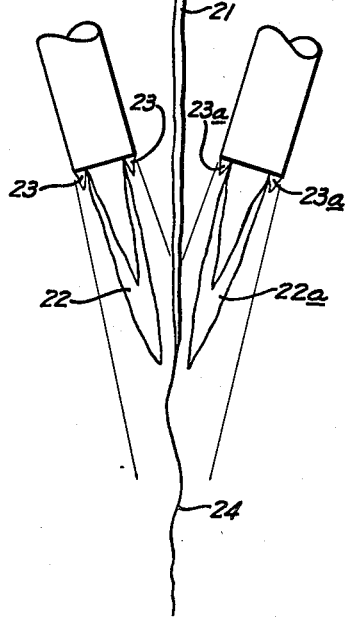
INVENTORS
BELA KARLOVITZ
BERNARD LEWIS
GUENTHER VON ELBE
BY
THEIR ATTORNEYS

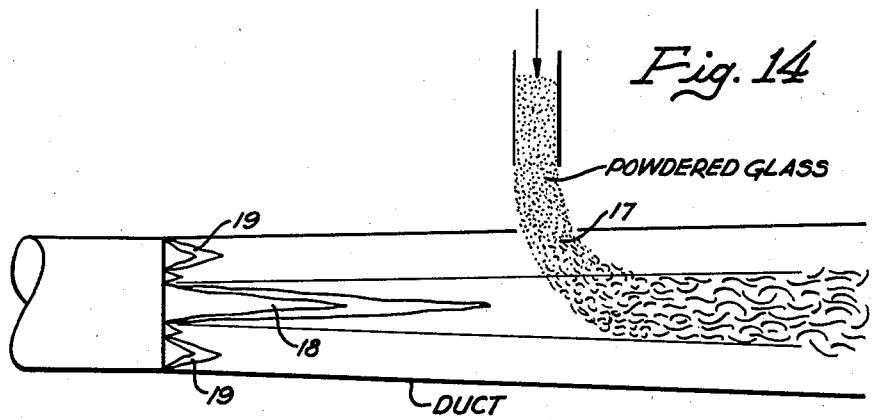
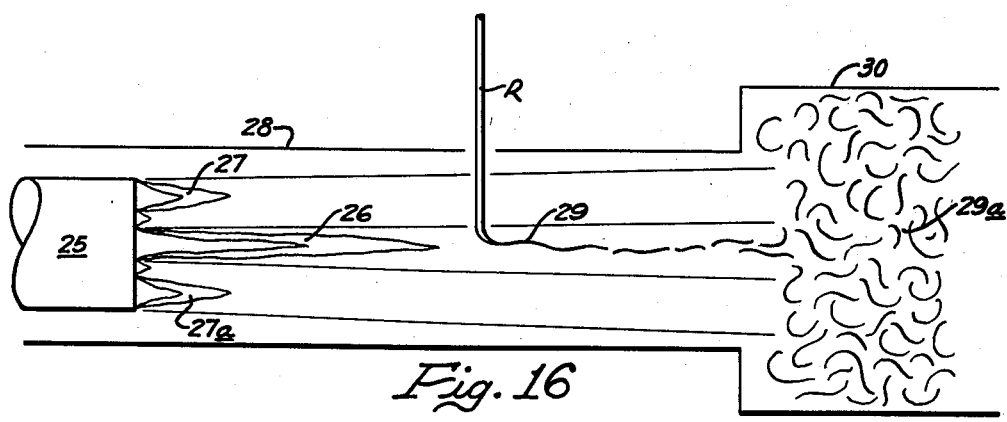
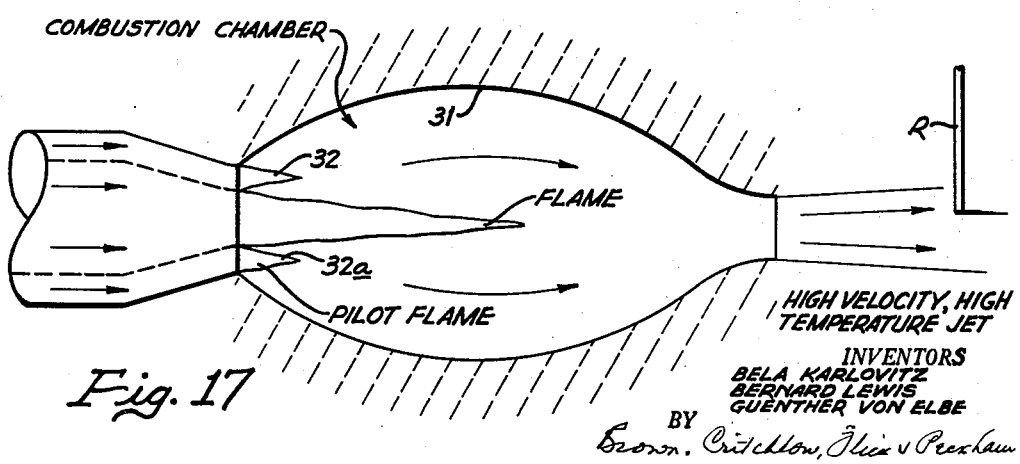

United States Patent Office 2,925,620
Patented Feb. 23, 1960

2,925,620

GLASS FIBER PRODUCTION

Béla Karlovitz, Bernard Lewis, and Guenther von Elbe, Pittsburgh, Pa., assignors to Combustion and Explosives Research, Inc., Pittsburgh, Pa., a corporation of Pennsylvania Application March 24, 1955, Serial No. 496,438

9 Claims. (Cl. 18—47.3)

This invention relates to the production of glass fibers, and more particularly to doing so by means of stabilized turbulent flames.

The invention will be described with reference to the accompanying drawings in which Fig. 1 is a schematic sectional view of a combustion chamber for the conventional production of a high velocity, high temperature jet representative of one prior method of producing glass fibers; and Fig. 2 is a schematic representation according to this invention of another means of producing a high-velocity, high-temperature jet without the combustion chamber of Fig. 1; and Figs. 3 to 10 are schematic representations of various modes of applying the present invention to production of glass fibers by stabilized high-temperature, high-velocity turbulent flames, using glass rods of relatively small diameter such as used in prior practice;

Figs. 11 and 12 are schematic vertical and plan views showing the present invention as applied to the production of glass fibers from sheet glass feed;

Fig. 13 is a plan view of one conformation of sheet glass applicable to the embodiment of Figs. 11 and 12;

Fig. 14 is a schematic side elevation of the invention as applied to the production of glass fibers from powdered glass stock;

Fig. 15 illustrates the application of the invention to the production of glass fibers from molten glass feed;

Fig. 16 schematically shows another embodiment of the invention; and

Fig. 17 is a schematic representation of one mode of applying the present invention to the stabilization of flame in a combustion chamber.

The glass fiber manufacturing process requires high flow velocity and high gas temperature for high production rates of fine fibers. At present glass fibers are produced commercially from small-diameter glass rods R, of the order of a few millimeters diameter, fed progressively into a high-velocity, high-temperature gas stream S which issues through a narrow slot 1 from a combustion chamber 2. The fuel-air mixture is burned at moderate flow velocity in the combustion chamber, and the gas from the hot flame 3 is accelerated to the required high velocity in the exit slot 1 of the combustion chamber, shown schematically in Fig. 1. This burner design permits stabilization of the flame by conventional means in the chamber because combustion takes place at relatively low flow velocity. However, it imposes a severe limitation on the process, because in order to prevent damage to the refractory lining of the combustion chamber 2 the temperature of the flame gas must not exceed a permissible limit. If this limitation did not exist, a substantial increase of the flame temperature and hence of the efficiency of the process could be achieved by means of preheat or by admixture of oxygen, or both. Furthermore, save for this limitation, it would be feasible by increase of the chamber pressure to increase the flow velocity very greatly, even into the supersonic range, provided that the flame is maintained stabilized and complete combustion is effected by suitable means. With the existing system this is not feasible for the following reason. As the gas from flame 3 passes through the slot 1 it expands from the pressure in the combustion chamber, i.e., the feed pressure, to the ambient atmospheric pressure, and its temperature drops below the temperature in the chamber according to the law of adiabatic expansion. Hence, as the feed pressure and therefore the velocity of the stream is increased, the temperature decreases correspondingly, and finally the gain in efficiency resulting from increased velocity is offset by the loss of efficiency resulting from the temperature decrease.

Furthermore, for every explosive mixture there is a velocity gradient above which the flame will blow off from the burner port, and turbulent flames are stable only at moderate flow velocities at the rim of the port.

Figure 2:
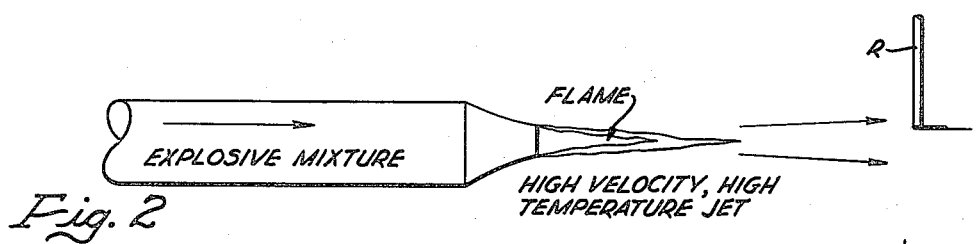

The disadvantages and limitations of the combustion chamber system can be overcome if the required high velocity of the gas flow is brought about by accelerating the unburned mixture instead of the burned gas. In this way the combustion chamber can be dispensed with. Thus, the gases may be burned as an open flame, as shown schematically in Fig. 2. The particular problem for the successful operation of such burner is the stabilization of the flame at the high flow velocity required by the glass fiber manufacturing process, which is of the order of sound velocity or even greater. That is, unless the flame is stabilized smaller or larger portions of the fuel escape unignited, reducing combustion efficiency, as the upstream velocity increases, and the flame may actually blow out. Hence for efficiency the continuity of the flame and complete combustion must be maintained.

In order to discuss this problem, it is necessary to explain the nature of the combustion process in flames and the principles of stabilization of flames on burner ports.

It is recognized that the transformation of the fuel-oxidant mixture from the unburned to the burned state takes place within a narrow layer usually referred to as the "combustion wave." Within this layer the temperature rises steeply from the original low value of the unburned side of the wave to its final high value on the burned side. A plot of temperature along a line normal to the wave would show a roughly S-shaped curve which is flat on both ends, viz., toward the unburned side in front, or upstream, of the wave and toward the burned side behind the wave crest. Heat flows rapidly by conduction across the wave front from the burned to the unburned side. A volume element (i.e., a very small, or increment, volume) of the unburned mixture, on being overrun by the combustion wave, thus experiences a large and rapid temperature rise. Since the rate of combustion is very small at the initial temperature but increases with temperature at a high order, the volume element at first merely absorbs heat as if it were an inert material, until it reaches a point some distance inside the wave where the temperature becomes so high that rapid combustion ensues. From this instant on and until the temperature crest of the wave has passed, the volume element constitutes a source of heat. Its source strength increases at first because the rising temperature accelerates the combustion, but since the trend is reversed as the exhaustion of fuel and oxygen proceeds, the source strength in time passes through a maximum and then decreases steadily even though the temperature is still rising. When the heat liberation has substantially subsided, the volume element has arrived at the crest of the wave. During the period of heat liberation the volume element loses heat to the adjacent cooler regions upstream, i.e., toward the unburned side, in an amount equal to that which it had received before becoming a heat source; in this way, heat is continuously "borrowed" and "repaid" in the wave out of what may be called a "revolving heat fund" which travels with the progress of the wave and is referred to as the excess enthalpy, $h$, of the combustion wave.

The velocity of propagation of the wave relative to the unburned gas is called the burning velocity. It depends on the properties of the mixture, and if the wave is at rest it is equal to the component of the flow velocity normal to its surface. On passing through the wave, the gas stream is accelerated because of the volume expansion resulting from the temperature rise.

In burner flames a fuel-oxidant mixture, capable of supporting a combustion wave, flows from an orifice—the burner port—into the atmosphere. Within the burner duct the flow velocity is everywhere larger than the burning velocity so that the combustion wave cannot penetrate, or flash back, into the duct. Outside the duct, however, the stream is progressively slowed down by friction and mixing with the ambient atmosphere at the stream boundary, and this leads to fixation or "anchoring" of the combustion wave, i.e., flame stabilization, in the following manner.

Within the stream one may visualize the distribution of flow velocity by a series of contour surfaces of constant velocity. These surfaces slope at an angle from the stream boundary into the interior in accordance with the fact that the velocity decreases more rapidly at the stream boundary than in the interior; in a cylindrical jet stream, for example, the surfaces assume more or less conical shapes with the apex in the axis. There exists one such surface along which the flow velocity is exactly equal to the burning velocity. Downstream from this surface the burning velocity exceeds the flow velocity, so that the wave tends to be driven toward the burner port; whereas upstream, the flow velocity exceeds the burning velocity, so that the wave tends to be driven away from the burner port. The combustion wave thus penetrates upstream as far as it can go, that is, to the base of the surface of equal burning and flow velocities. While remaining anchored there, the wave is able, within limitations to be discussed later, to progress through the surface of equal burning and flow velocities into the region of higher flow velocities everywhere else in the stream. This is due to the fact that the mechanism of wave propagation tends to preserve the continuity of the wave sheet so that, instead of being torn away from the anchor region, the wave sheet is "stretched" over the stream cross section. In this process the wave sheet or surface orients itself to the stream in such a way that the burning velocity becomes everywhere equal to the component of the flow velocity normal to the wave surface. In this adjustment the surface area of the wave becomes exactly that required to burn all of the fuel-oxidant mixture that is carried by the stream into the standing wave.

Stream turbulence causes the contour surfaces and hence the wave sheet to fluctuate irregularly at any point in the stream. The turbulence intensity is strongly increased by the randomization of the direction in which the stream is accelerated by the fluctuating wave. However, the principle of flame stabilization is not fundamentally altered by stream turbulence.

The foregoing provides the basis for discussing the problem of high-velocity burners.

When the flow rate of the unburned stream is increased the surface of equality of flow and burning velocities shifts toward the stream boundary. However, at the stream boundary the burning velocity decreases to zero because the ambient incombustible atmosphere (air) penetrates into the stream and dilutes, or weakens, the fuel-oxidant mixture. Hence, at sufficiently high flow rates the surface of equality of velocities vanishes; the flow velocity is everywhere higher than the burning velocity and the flame blows off.

To remedy this situation, one may place an obstruction (flame holder) into the interior of the stream where dilution can not penetrate. Such obstruction decreases the flow velocity in its vicinity and therefore may serve as a device for anchoring the flame. This device fails at higher flow velocities because the flow lines close in downstream from the obstruction, thereby preventing fresh mixture from reaching the flame anchoring region. It is often the practice to place such obstructions into the stream near the rim of the burner port in order to anchor the flame near the rim. For very high velocities and severe conditions of stream turbulence, a flame anchor may be provided by an independently controlled supply of fuel and oxidant at the burner rim, that is, by an independent pilot flame enveloping the burner port.

The provision of such pilot flame does not in itself assure that the combustion wave will extend over the stream as a continuous surface. This is due to the fact that there is a limit to the "stretching" that a combustion wave can tolerate; at sufficiently high flow rate of the main stream the wave breaks completely away from the pilot flame, and the fuel-oxidant mixture sweeps unburned past the pilot flame. The stream turbulence has the effect that already at somewhat lower flow rates localized and random interruptions of the combustion wave occur at the stream boundary, forming holes in the wave through which fuel-oxidant mixture escapes unignited. In this condition the flame remains anchored, but the combustion efficiency is decreased and flame noise is increased.

It is among the objects of this invention to provide a method of producing glass fibers by means of stabilized high velocity turbulent flames that is applicable to any desired velocity of flow to maintain the continuity of the combustion wave, either in sonic or supersonic ranges of fuel flow, that affords optimum combustion efficiency, that is applicable to solid, liquid or gaseous fuels, that is applicable to glass rods of fine or coarse diameter, to molten glass, and to sheet or powdered glass feed, and that overcomes the disadvantages referred to above.

Other objects will appear from the following specification.

We have discovered, and it is upon this that our invention is in large part predicated that an area element of a combustion wave "stretches" without "breaking" only if the characteristic quantity $$\frac{1}{\eta U}\frac{\partial U}{\partial y} \qquad (1)$$

is smaller than a critical value which is of the order of 2 to 3, which, in other words, we find is the criterion for maintenance of continuity of the combustion wave. Here $\eta$ is a measure of the thickness of the combustion wave;
$U$ is the local flow velocity;
$y$ is the coordinate, or component of flow velocity, normal to the direction of the flow; and
$\frac{\partial U}{\partial y}$ is the velocity gradient of the flow.

The value of $\eta$ depends upon the nature of the fuel-oxidant mixture. The values of $U$ and $\partial U/\partial y$ depend upon the velocity profile of the stream. Toward the stream boundary $U$ decreases to zero and $\partial U/\partial y$ increases to a maximum, so that the characteristic quantity $$\frac{1}{\eta U}\frac{\partial U}{\partial y}$$

attains the critical value for stretching at some distance $y_c$ from the boundary, and is smaller than that value for larger values of $y$ farther inside the stream. Denoting the values of the velocity and of the velocity gradient at $y_c$ by $U_c$ and $g$, respectively, one may thus write the approximate equation $$\eta \frac{1}{U_c} \cdot g \simeq 2 \text{ to } 3 \qquad (2)$$

The pilot flame must, we find, provide sufficient energy to ignite the stream to the depth $y_c$ from the boundary. This is the case if the condition $$q = \frac{1}{\psi} h U_c \qquad (3)$$

is fulfilled. Here, $\psi$ is the efficiency of transfer of enthalpy from the pilot flame to the layer to be ignited,
$q$ is the heat developed by the pilot flame per unit length and time,
$h$ is the excess enthalpy of the combustion wave mentioned previously, $q$ and $\psi$ represent the pilot strength and pilot efficiency, respectively. Since, with increasing flow rate the boundary velocity gradient $g$ increases, $U_c$, as determined by Equation 2, also increases, and the pilot strength $q$ must be made larger according to Equation 3.

If the flow rate and the burner diameter are specified, the value of $g$ may be estimated from available hydraulic equations. For natural gas-air mixtures, $\eta$ is of the order of about one millimeter. From this information, the value of $U_c$ can be estimated by means of Equation 2. The value of $h$ for such mixtures, determined on the basis of our studies, is about $3 \times 10^{-3}$ calories per square centimeter, and the efficiency $\psi$, according to our experience, is of the order of a few percent. Using these values of $U_c$, $h$ and $\eta$, the pilot strength $q$ may be estimated by means of Equation 3.

It is thus possible in accordance with this invention to design burners possessing desired characteristics as to flow velocity with complete flame stabilization, or continuity, and efficient combustion, and through the invention there is no theoretical limit to flow velocity at which flames can be stabilized for the production of glass fibers.

*Example for the required pilot strength of a high-velocity flame.*—Condition for the maintenance of the continuity of the combustion wave is:

$$\frac{1}{U_c} \eta \frac{\partial U}{\partial y}$$

Therefore, the pilot flame has to ignite the flow up to the velocity:

$$U_c = \frac{1}{2} \eta \frac{\partial U}{\partial y}$$

This determines the required pilot flame strength:

$$q = \frac{1}{\psi} h U_c$$

Given:
Stoichiometric natural gas-air flame
Burner tube diameter, $D = 5$ cm.
Flow velocity, $\overline{U} = 5000$ cm./sec.

Reynolds number, from standard equations:

$$R_e = \frac{\overline{U} D}{\eta} = \frac{5000 \times 5}{0.156} = 160{,}000$$

Velocity gradient:

$$\frac{\partial U}{\partial y} = \frac{\overline{U}}{D} \frac{R_e^{0.75}}{15.3} = \frac{5000}{5} \frac{160{,}000^{0.75}}{15.3} = 5.23 \times 10^5 \text{ cm./sec.}$$

Combustion wave thickness:

$$\eta = \frac{\lambda}{c_p \rho S_u} = \frac{0.578 \times 10^{-4}}{0.24 \times 1.29 \times 10^{-3} \times 40} = 0.446 \times 10^{-2} \text{ cm.}$$

where $\lambda$ heat conductivity $$\frac{\text{cal.}}{\text{cm. } ^\circ\text{C. sec.}}$$

$c_p$ = specific heat in cal./g.
$\rho$ = density in g./cm.$^3$
$S_u$ = burning velocity in cm./sec.

With the above data:

$$U_c = \frac{1}{2} \eta \frac{\partial U}{\partial y} = \frac{1}{2} \times 0.446 \times 10^{-2} \times 5.23 \times 10^5 = 1165 \text{ cm./sec.}$$

The excess enthalpy of the combustion wave is:

$$h = \frac{\lambda}{S_u}(T_b - T_u) = \frac{0.578 \times 10^{-4}}{40}(2300 - 300)$$
$$= 3.10^{-3} \text{ cal./cm.}^2$$

where $T_b$ is the temperature of the burned gas in ° K., and $T_u$ is the temperature of the unburned gas in ° K., the efficiency of the pilot flame, based on experience is $$\psi = 0.05$$

Hence the required strength of the pilot flame:

$$q = \frac{h U_c}{\psi} = \frac{3.10^{-3} \times 1165}{0.05} = 70 \text{ cal./cm.}$$

And a pilot flame of this strength will keep a flame under the specified condition stabilized.

Figure 3:
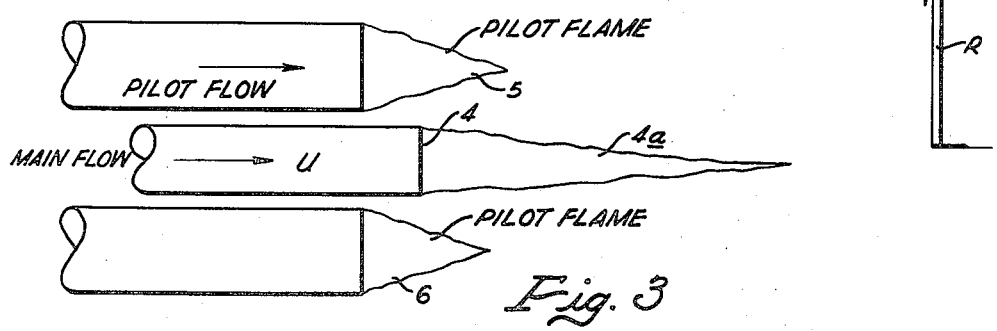

The invention as applied to the production of glass fibers is shown schematically in Fig. 3. A high-velocity main stream of explosive gas-air mixture, U of the order of 1000 to 1500 ft./sec. or more, issues from a narrow burner port 4 against a glass rod R of small diameter. The main flame 4a is stabilized in this stream by two pilot flames 5 and 6 arranged on both sides of flame 4a, computed to supply the requisite energy as detailed above. At flow velocities which are of the order of sound velocity, the required pilot strength for flame stabilization is considerable, but this is not wasteful because the heat of the pilot flames serves other important purposes as well, such as preheating the glass rods, and protecting the high-velocity flow from dilution by cold air.

Figure 4:
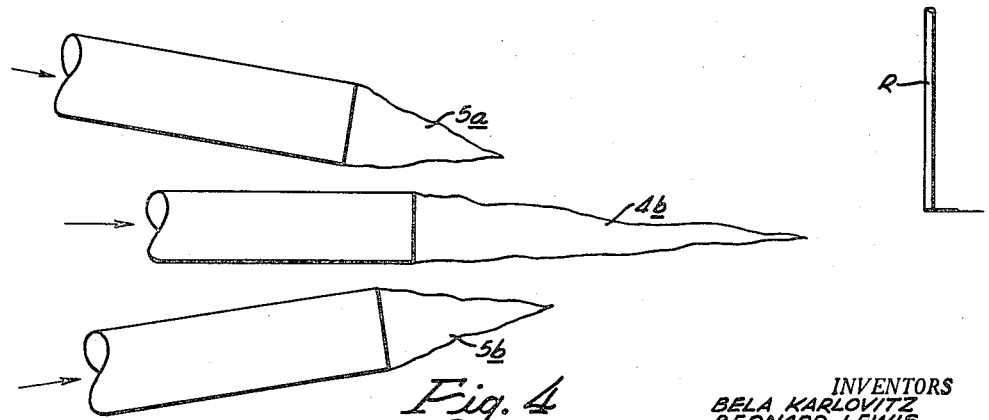

The individual pilot flames 5a and 5b, Fig. 4, may be suitably inclined toward the main flame 4b in order to control the contacts between the streams, and also in order to restrict the broadening of the flame 4a from the high-velocity flow and thereby preserving or increasing its flow velocity, as schematically shown in Fig. 4. An annular pilot flame may be used instead of a plurality of individual pilots.

The above-described high-velocity burners promise substantial advantages in the manufacture of glass fibers. The absence of a ceramic-lined combustion chamber permits the application of substantial preheat of the fuel-oxidant mixture. The use of pre-heat, coupled with the absence of radiation losses from the ceramic wall, permits the attainment i.e. of much higher gas temperatures at the point of fiber formation than have been previously possible. Thereby the use of glasses with higher melting points becomes practical, and the production rate can be increased because more heat can be transmitted per unit time to the stock. Also, higher flow velocities can be realized with the new flame stabilization without sacrificing temperature because the reduction of the temperature of the flow due to adiabatic expansion from the feed pressure to atmospheric pressure is smaller than in the case of Fig. 1 and can be readily compensated by preheat. Increased flow velocity again leads to finer fibers and increased production rate, or both.

By proper choice of the preheat temperature, the flow velocity, and the width, or diameter, of the high-velocity fuel jet, the new high-velocity combustion can be adapted to any desired special purpose, such as high production rate, or the manufacture of superfine grade fibers, or the use of high-melting point glasses, etc. The use of such glasses may be motivated by a desire to utilize more readily available raw materials, or to manufacture of insulating materials which can withstand higher temperatures. By the use of oxygen-enriched air, or special fuels, it is possible to exceed substantially the flame temperatures obtainable from natural gas-air mixtures, and the production of fiber products from quartz or other materials with high melting point, like aluminum oxide, becomes practical. Such fibers have very valuable applications for high-temperature insulation purposes, or where the properties of the material have special significance.

The flow velocity of the flame jet is not limited by the velocity of sound. If it becomes necessary, it is possible to accelerate the flow to supersonic values in, for example, a Laval nozzle and to maintain the flame by suitable pilot flames, in the manner of this invention, in this supersonic stream. I.e., in Fig. 5 the main fuel stream flows through a Laval type nozzle 6 at supersonic velocity, and the flame is stabilized by pilot flames 5c and 5d supplying pilot strength as described.

It may be desirable to produce glass fibers which are not straight, but are wavy or crinkled to some desired degree. Turbulence continually increases, in the average, the distance between any two points of the stream. Therefore, strong turbulence assists the stretching of fibers. It may help also to initiate the drawing of additional fibers from the melt. For this purpose a gas stream with high turbulence is required. Flames burning in turbulent streams are in themselves powerful sources of turbulence. If the flame is enclosed in a combustion chamber this flame-generated turbulence is mostly lost before it can reach the region where the fibers are drawn, whereas an open flame, F, i.e., open to the ambient atmosphere, such as shown in Fig. 6, produces turbulence just ahead of this region where it can be beneficial. Additional turbulence can be generated by other means. Thus, depending upon the flow conditions and the desired effect, it may become desirable to insert one or more turbulence-producing grids 7, Fig. 6, upstream of the flame. Because of the directional randomness of the stretching, turbulence crinkles the fibers, which may be desirable for some purposes instead of fibers that are straight.

Stabilization of the flame in the high-speed flow is facilitated by the preheating of the mixture. It may also be facilitated by oxygen enrichment where air is the main oxidant, or by the use of fuels with high burning velocity, because all these factors reduce the thickness of the combustion wave which, according to Equation 2, helps to maintain the continuity of the combustion wave.

Reduction of the velocity gradient of the flow also facilitates stabilization. It may be accomplished by friction plates 8 and 8a inserted into the flow channel parallel to the direction of the flow, because such inserts reduce the flow velocity in the vicinity of the outer boundary of the flow, as seen in Fig. 7. Also, the flow may be built up by the confluence of several streams with different flow velocities such as mainstream 9 and secondary streams 10 and 10a, Fig. 8.

The pilot flames on both sides of the high-velocity jet need not be of the same size, because of the different additional functions it may be desired to give them, as for example, the functions described above. Their flow velocity, cross section, temperature and angle of impact may be adjusted to the local requirements. The pilot flames do not require the preheat temperature and the high pressure drop of the main flow. Therefore, they may be supplied from a separate feed system, permitting economy in the preheat and power requirements of the process.

Figure 9:
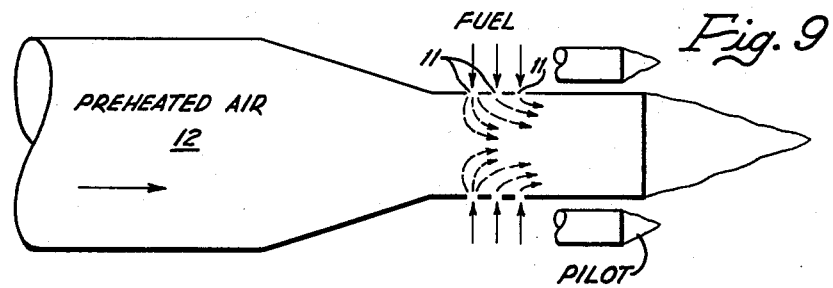

If high preheat temperature is applied, the mixing of the fuel and air must be accomplished immediately ahead of the flame and not further upstream in the feed system, in order to prevent autoignition of the mixture. Such rapid mixing can be accomplished by injecting the fuel in the form of fine high-velocity jets 11 into the stream 12 of air which has already been accelerated to high velocity as seen in Fig. 9.

Figure 10:
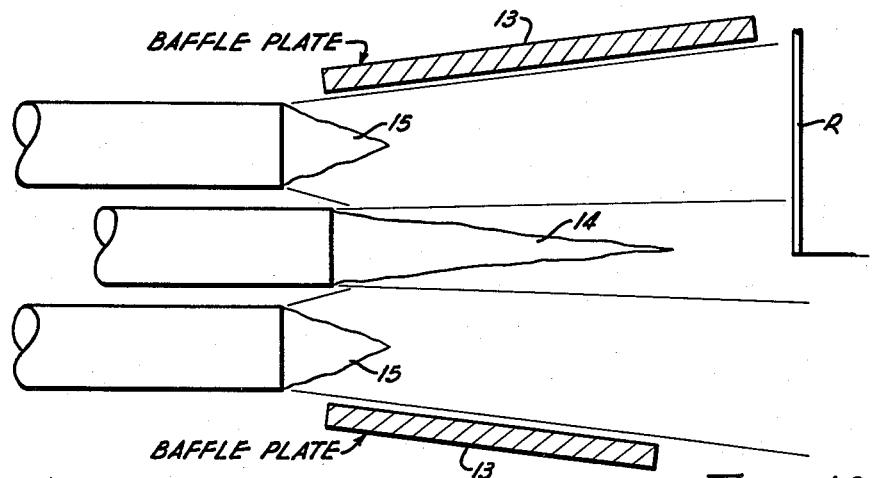

Baffle plates 13 of suitable size and shape may be applied at the outer edges of the high temperature stream and flame 14 and pilot flames 15 to reduce the mixing of the hot gas flow with the surrounding air, per Fig. 10.

Figure 1:
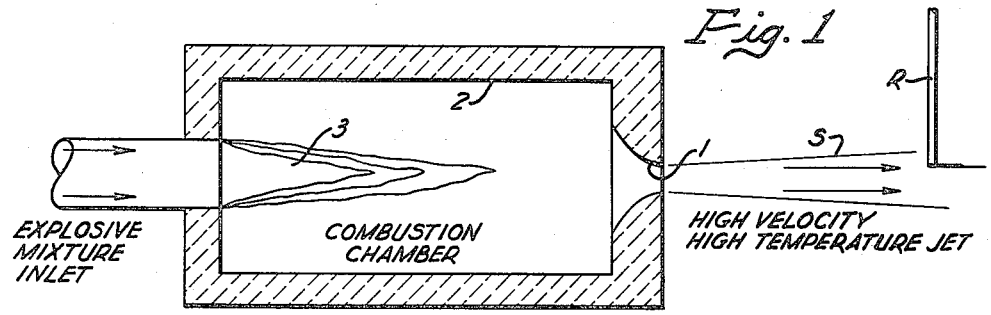
Figure 11:
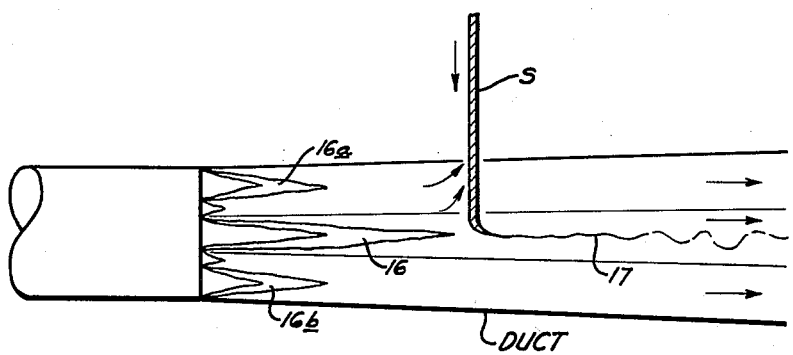

In prior practice using combustion chambers of the general type of Fig. 1, the glass stock fed to the flame has been of rather small diameter, e.g., of the order of a few millimeters. Such practices are utilizable in this invention for instance as indicated by Figs. 2 to 10. However, heavier section rods and other forms of glass may be converted into glass fibers by the high temperatures and velocities of the stabilized flames of this invention. For example, as seen schematically in Figs. 11 and 12 sheet glass S may be fed into the flame 16 stabilized by pilots 16a and 16b with the edge of the sheet exposed to the flame melting and breaking up into filaments 17. To facilitate this action, the sheet glass S may be ribbed or corrugated as seen in plan view in Fig. 13.

Likewise, the glass to be converted into fibers may be fed as finely divided glass into the stabilized flame, as shown in Fig. 14. Here particles of powdered glass 17 are projected into a flame 18 stabilized by one or more pilot flames 19 as described above. Here the inertia of the glass particles provides the reaction force required for the drawing of the glass fibers under the velocity of the flame.

Also, instead of solid glass the feed may be a stream of molten glass, as indicated by Fig. 15. Molten glass flows from a suitable supply through a bushing 20 to form a stream 21 that falls in the embodiment shown between a pair of converging high velocity flames 22 and 22a each stabilized by pilot flames 23 and 23a. The high velocity flame will accelerate the molten stream of glass and reduce it to fine fibers 24.

As described above, flame turbulence attenuates the fibers. After the fibers are drawn from the rod or other form of feed the high flow velocity is of no other use and, therefore, it may advantageously be converted into turbulence which in turn will cause further attenuation of the fibers and therefore produce finer products. There are various ways of producing turbulence. Such conversion of flow velocity into turbulence may, for example, be accomplished by a sudden increase of cross section of a channel enclosing the hot gas flow, for instance as schematically shown in Fig. 16. Here the burner 25 producing the main flame 26 stabilized by pilot flames 27 and 27a is disposed concentrically in a duct 28. A glass rod R is fed into the duct for impingement by flame 26 with formation of glass fiber 29 in an area of the duct in which the hot gases move at high velocity but with moderate turbulence. At a point where the fiber is well formed the cross sectional area is greatly increased to form a duct 30 in which the gases move with high turbulence but at low velocity, whereby the fibers are attenuated further and crinkled, as indicated at 29a. This use of a duct 28, 30 has the further advantage that cool air does not mix with the hot gases so that the fibers are maintained in a plastic condition longer than would otherwise be the case. During the attenuation the glass temperature should be held within certain limits as will assure proper viscosity of the glass fibers.

The production of glass fibers by means of the combustion chamber-type burner now in use may be improved likewise by substantially increasing the flow velocity of the fuel-air mixture entering the chamber. At the permissible upper limit of the chamber temperature, which is prescribed by the chamber refractory material, the combustion products in the chamber now possess not only heat acquired in the combustion process but also a substantial amount of kinetic energy because of their high flow velocity. The hot jet issuing from the chamber is accelerated further in the exit nozzles. Because the energy content of the gas per unit mass is larger than in the usual chamber-type burner system, the velocity and temperature of the jet can be higher. The distribution of the available energy between velocity and temperature energy can be chosen at will by suitable choice of the pressure drop in the exit nozzle.

Since the gas entering the chamber suffers a pressure and temperature drop as the high flow velocity is produced, a certain amount of preheat is required to attain the permissible flame temperature in the chamber. In view of the high flow velocity in the chamber the flame can not be held there by conventional means. However, through this invention the main flame can be stabilized in the chamber 31, Fig. 17, by means of suitable pilot flames 32 and 32a whose strength and efficiency satisfy the criteria established hereinabove.

Although reference has been made to flame produced by gas-air mixtures it will be appreciated that in the same way stabilization may be achieved of flames produced with other fuels such, for example, as liquid fuels, powdered solid fuels, combustible vapors, and the like with air or oxygen.

In some instances the pilot may be supplemented by a smaller pilot flame. For instance, in this way the stabilizing pilot flame described above may not need to be so large or powerful for some purposes.

This application is a continuation-in-part of our copending application Serial No. 449,402, filed August 12, 1954, now abandoned.

According to the provisions of the patent statutes, we have explained the principle of our invention and have illustrated and described what we now consider to represent its best embodiment. However, we desire to have it understood that, within the scope of the appended claims the invention may be practiced otherwise than as specifically described.

We claim:

1. That method of making glass fibers comprising the steps of feeding glass into a high velocity main flame produced by combustion of a fuel-oxidant mixture flowing from a burner port, and stabilizing said main flame with at least one adjacent pilot flame the strength of which is at least that represented by the equation $$q = \frac{1}{\psi} h U_c$$

where $q$ is the pilot flame strength, $h$ is the excess enthalpy of the combustion wave, $\psi$ is the pilot flame efficiency, and $U_c$ is the velocity gradient of the main flame according to the equation $$U_c = \frac{1}{2} \eta \frac{\partial U}{\partial y}$$

where $U_c$ is the local flow velocity, $y$ is the velocity coordinate normal to the direction of flow, and $\eta$ is the thickness of the combustion wave in the main flame, said flame converting the glass into fiber, and recovering the fiber.

2. A method according to claim 1, said fuel being combustible gas.

3. That method of making glass fibers comprising the steps of feeding glass into a high velocity main flame produced by turbulent combustion of a fuel-oxidant mixture flowing from a burner port, and stabilizing said main flame with at least one adjacent pilot flame the strength of which is at least that represented by the equation $$q = \frac{1}{\psi} h U_c$$

where $q$ is the pilot flame strength, $h$ is the excess enthalpy of the combustion wave, $\psi$ is the pilot flame efficiency, and $U_c$ is the velocity gradient of the main flame according to the equation $$U_c = \frac{1}{2} \eta \frac{\partial U}{\partial y}$$

where $U_c$ is the local flow velocity, $y$ is the velocity coordinate normal to the direction of flow, and $\eta$ is the thickness of the combustion wave in the main flame, said flame converting the glass into fiber, and recovering the fiber.

4. A method according to claim 3, said mixture being gas-air in substantially stoichiometric proportions.

5. That method of making glass fibers comprising the steps of feeding glass into a main flame produced by turbulent combustion of a fuel-oxidant mixture flowing from a burner port at a velocity of at least about 1000 feet per second, and stabilizing said main flame with at least one adjacent pilot flame the strength of which is at least that represented by the equation $$q = \frac{1}{\psi} h U_c$$

where $q$ is the pilot flame strength, $h$ is the excess enthalpy of the combustion wave, $\psi$ is the pilot flame efficiency, and $U_c$ is the velocity gradient of the main flame according to the equation $$U_c = \frac{1}{2} \eta \frac{\partial U}{\partial y}$$

where $U_c$ is the local flow velocity, $y$ is the velocity coordinate normal to the direction of flow, and $\eta$ is the thickness of the combustion wave in the main flame, said flame converting the glass into fiber, and recovering the fiber.

6. That method of making glass fibers comprising the steps of feeding glass into a main flame produced by turbulent combustion of a fuel-oxidant mixture flowing at a velocity of at least 1000 feet per second from a burner port into the unconfined atmosphere, and stabilizing said main flame with an adjacent pilot flame the strength of which is at least that represented by the equation $$q = \frac{1}{\psi} h U_c$$

where $q$ is the pilot flame strength, $h$ is the excess enthalpy of the combustion wave, $\psi$ is the pilot flame efficiency, and $U_c$ is the velocity gradient of the main flame according to the equation $$U_c = \frac{1}{2} \eta \frac{\partial U}{\partial y}$$

where $U_c$ is the local flow velocity, $y$ is the velocity coordinate normal to the direction of flow, and $\eta$ is the thickness of the combustion wave in the main flame, said flame converting the glass into fiber, and recovering the fiber.

7. A method according to claim 6, said mixture being gas-air in substantially stoichiometric proportions.

8. A method according to claim 1 in which said combustion occurs in an enclosed combustion chamber having an exit nozzle in which the velocity of flow is further accelerated.

9. A method according to claim 1 in which the fibers after being formed and while still plastic are subjected to highly turbulent conditions and are thereby further attenuated.

References Cited in the file of this patent

UNITED STATES PATENTS

| | | |
|---|---|---|
| 2,489,243 | Stalego | Nov. 22, 1948 |
| 2,614,619 | Fuller | Oct. 21, 1952 |
| 2,645,814 | Stalego | July 21, 1953 |
| 2,681,696 | Stalego | June 22, 1954 |